US011581753B2

(12) United States Patent
Tognina et al.

(10) Patent No.: US 11,581,753 B2
(45) Date of Patent: Feb. 14, 2023

(54) WIRELESS IMAGER WITH WIRELESS POWER SYSTEM

(71) Applicant: Varex Imaging Corporation, Salt Lake City, UT (US)

(72) Inventors: Carlo Tognina, Salt Lake City, UT (US); John Shen, Salt Lake City, UT (US); Matt McCabe, Salt Lake City, UT (US); Marcelo Costa, Salt Lake City, UT (US)

(73) Assignee: Varex Imaging Corporation, Salt Lake City, UT (US)

( * ) Notice: Subject to any disclaimer, the term of this patent is extended or adjusted under 35 U.S.C. 154(b) by 215 days.

(21) Appl. No.: 16/865,283

(22) Filed: May 1, 2020

(65) Prior Publication Data

US 2021/0159729 A1 May 27, 2021

Related U.S. Application Data

(60) Provisional application No. 62/941,521, filed on Nov. 27, 2019.

(51) Int. Cl.
*H02J 50/10* (2016.01)
*H02J 50/80* (2016.01)
*G01T 1/24* (2006.01)
*H02J 50/90* (2016.01)
*H02J 7/02* (2016.01)

(52) U.S. Cl.
CPC .............. *H02J 50/10* (2016.02); *G01T 1/247* (2013.01); *H02J 7/02* (2013.01); *H02J 50/80* (2016.02); *H02J 50/90* (2016.02)

(58) Field of Classification Search
None
See application file for complete search history.

(56) References Cited

U.S. PATENT DOCUMENTS

| 8,861,678 | B2 | 10/2014 | Liu et al. |
| 8,891,733 | B2 | 11/2014 | Liu et al. |
| 9,380,988 | B2* | 7/2016 | Kitano ..................... A61B 6/56 |
| 9,837,846 | B2* | 12/2017 | Partovi ................... H02J 50/70 |
| 10,018,613 | B2* | 7/2018 | Potyrailo ............ G01N 33/2888 |

(Continued)

*Primary Examiner* — Thomas J. Hiltunen
(74) *Attorney, Agent, or Firm* — Laurence & Phillips IP Law

(57) ABSTRACT

Some embodiments include a radiographic imaging system, comprising: a radiographic imager, including: an imaging array; imager control logic configured to control the imaging array; a power system configured to supply power to at least the imaging array and the imager control logic; a wireless power receiver configured to receive energy wirelessly and provide at least part of that energy to the power system; and a wireless communication transmitter; and a charging mat, including: a wired power input; a wireless power transmitter configured to transmit energy wirelessly; and a wireless communication receiver; wherein the wireless power receiver, the wireless power transmitter, the wireless communication receiver, and the wireless communication transmitter are positioned such that the radiographic imager can be placed on the charging mat where, simultaneously, the wireless power receiver is aligned with the wireless power transmitter and the wireless communication receiver is aligned with the wireless communication transmitter.

18 Claims, 12 Drawing Sheets

(56) References Cited

U.S. PATENT DOCUMENTS

2011/0291614 A1* 12/2011 Yeh .................. B60R 11/02
                                                320/108
2018/0069358 A1* 3/2018 Miller ................ H02J 50/10
2018/0220988 A1* 8/2018 Jeon .................. H02J 50/80
2020/0041670 A1* 2/2020 Ishioka ............... A61B 6/542

* cited by examiner

WIRELESS IMAGER WITH WIRELESS POWER SYSTEM

Wireless imagers may be used in radiographic imaging systems, such as x-ray systems. A wireless imager may include a rechargeable battery that enables the wireless imager to operate for a limited time without external power. However, the battery will eventually need recharging and must be removed from the radiographic imaging system.

DETAILED DESCRIPTION

Some embodiments relate to imagers and charging systems for radiographic imaging systems. Some embodiments include a system that may be used to retrofit existing radiographic imaging systems to allow in-bucky wireless charging of wireless digital imagers. A bucky is a drawer like device which is used to hold an x-ray cassette or digital imager. The bucky can be mounted on a wall or under an examination table. In addition to retaining the the x-ray cassette or digital imager, the bucky can include other features, such as inbuilt grid or radiation filters to improve the quality of x-ray images by absorbing the scattered radiation.

Analog radiographic systems may be converted into digital radiographic imagers. Digital wireless imagers or panels may be used as part of the conversion. However, such wireless imagers may need frequent charging and/or replacement of the batteries. This may reduce the time the imager can be in service, add overhead to the hospital workflow, or the like. In some embodiments, the capability of wireless charging, such as inductive charging, may alleviate a need to replace a battery by allowing the battery to be charged in the device.

However, implementing inductive charging alone may not provide a substantial improvement, as the panel may need to be physically placed out of the bucky and on a charger, removing it from service. Inductive chargers could be placed inside a bucky, but this may involve a substantial retrofit of existing buckys and hospital equipment to implement. Furthermore, wirelessly charging a panel during image acquisition or transmission could cause interference in the image acquisition, leading to image artifacts or loss of data.

Figure 1:
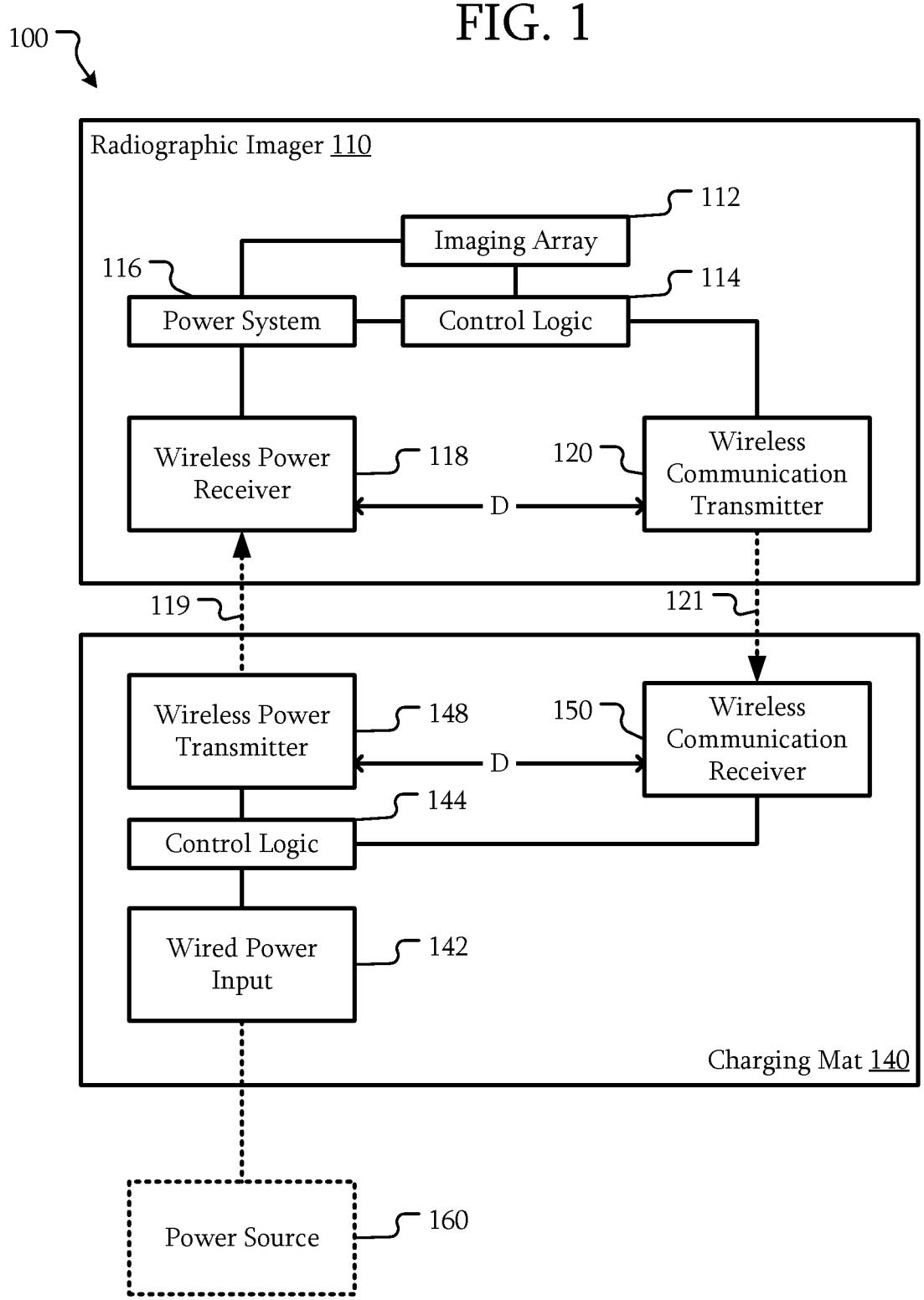
FIG. 1 is a block diagram of radiographic imaging system according to some embodiments.

FIG. 1 is a block diagram of radiographic imaging system according to some embodiments. In some embodiments, a radiographic imaging system 100 includes a radiographic imager (RI) 110 and a charging mat 140. Other components may be part of the radiographic imaging system 100 and will be described in further detail below.

The radiographic imager 110 is a device configured to convert incoming radiation and/or charged particles into a two-dimensional image. Examples of such incoming radiation and/or charged particles include x-rays, gamma rays, neutrons, or the like. The radiographic imager 110 includes an imaging array 112 configured to generate data that may be converted into an image and/or video. The imaging array 112 may include an array of sensors. The sensors may be direct conversion sensors configured to convert the incident photons or particles to a signal; however, in other embodiments, the imaging array 112 may include other conversion materials such as a scintillator may be present to convert the photons or charged particles into a form that may be detected.

The radiographic imager 110 includes control logic 114. The control logic 114 is configured to control the radiographic imager 110 such as by controlling the imaging array 112, the power system 116, the wireless power receiver 118, the wireless communication transmitter, or the like. The control logic 114 may include a general purpose processor, a digital signal processor (DSP), an application specific integrated circuit, a microcontroller, a programmable logic device, discrete circuits, a combination of such devices, or the like. The control logic 114 may include one or more processors and interfaces, such as address and data bus interfaces, interrupt interfaces, or the like. In addition, other interface devices, such as logic chipsets, hubs, memory controllers, communication interfaces, switches, actuators or the like may be part of the control logic 114 to interface the control logic 114 to internal and external components of the radiographic imager 110. While the control logic 114 is illustrated as a single block, the control logic 114 may be distributed about the radiographic imager 110.

The radiographic imager 110 may include a power system 116. The power system 116 may be configured to supply power to at least the imaging array 112 and the control logic 114. The power system 116 may be configured to supply power to other portions of the radiographic imager 110.

The radiographic imager 110 includes a wireless power receiver 118 configured to receive energy 119 wirelessly. For example, wireless power receiver 118 may include inductive, capacitive, radiative power coupling circuitry to convert the incoming energy into a form usable by the power system 116 and provide at least part of that energy 119 to the power system 116.

The radiographic imager 110 includes a wireless communication transmitter 120. The wireless communication transmitter 120 may include a transmitter of a communication system such as an optical communication system including infrared (IR) communication system or a visible light communication system, or a near-field wireless communication system such as near-field communication (NFC) or Bluetooth, or the like. In some embodiments, the radiographic imager 110 includes only the transmitter portion of such as system. For example, the wireless communication transmitter 120 may include only an IR light emitting diode (LED) for transmission of information but not an IR photodetector to detect an incoming signal. Accordingly, a communication link formed may be as a unidirectional communication link.

The radiographic imaging system 100 includes a charging mat 140. The charging mat 140 includes control logic 114, a wired power input 142, a wireless power transmitter 148, and a wireless communication receiver 150.

The control logic 144 may be configured to control the charging mat 140 such as by controlling the wireless power transmitter 148 and the wireless communication receiver 150. The control logic 144 may include a general purpose processor, a digital signal processor (DSP), an application specific integrated circuit, a microcontroller, a programmable logic device, discrete circuits, a combination of such devices, or the like. The control logic 144 may include one or more processors and interfaces, such as address and data bus interfaces, interrupt interfaces, or the like. In addition, other interface devices, such as logic chipsets, hubs, memory controllers, communication interfaces, switches, actuators or the like may be part of the control logic 144 to interface the control logic 144 to internal and external components of the charging mat 140. While the control logic 144 is illustrated as a single block, the control logic 144 may be distributed about the charging mat 140.

The charging mat 140 includes a wired power input 142. The wired power input 142 is configured to connect to a power source 160 and receive power over a wired electrical connection. In some embodiments, the wired power input 142 is the only wired electrical connection to the charging mat 140. The wired electrical connection can receive power from wall or grid power. The wired power input 142 may include a connector, a cable and connector, or the like.

The wireless power transmitter 148 is configured to transmit energy 119 wirelessly. The control logic 144 may be configured to cause energy to be supplied from the wired power input 142 to the wireless power transmitter 148. The wireless power transmitter 148 is paired with the wireless power receiver 118 of the radiographic imager 110. That is, the wireless power transmitter 148 includes a transmitter corresponding to the particular implementation of the wireless power receiver 118. For example, if the wireless power receiver 118 includes an inductive power receiver, the wireless power receiver 118 includes an inductive power transmitter. Accordingly, energy 119 may be transferred from the power source 160 through the charging mat 140, via the wired power input 142 and the wireless power transmitter 148, to the radiographic imager 110.

The charging mat 140 includes a wireless communication receiver 150. The wireless communication receiver 150 is paired with the wireless communication transmitter 120. That is, the wireless communication receiver 150 includes communication circuitry corresponding to the particular implementation of the wireless communication transmitter 120. For example, the if the wireless communication transmitter 120 includes and IR transmitter, the wireless communication receiver 150 includes an IR receiver.

The wireless power receiver 118 and the wireless communication transmitter 120 are positioned on the radiographic imager 110 in a manner corresponding to the position of the wireless power transmitter 148 and the wireless communication receiver 150 such that both may function to transmit power or communications at the same time when the radiographic imager is placed on the charging mat in a particular orientation aligning the two pairs. For example, the wireless power receiver 118 and the wireless communication transmitter 120 may be physically separated on the radiographic imager 110 by a distance D. The wireless power transmitter 148 and the wireless communication receiver 150 may also be physically separated on the radiographic imager 110 by the same distance D. The radiographic imager 110 may be placed on the charging mat 140 so that the wireless power receiver 118 overlaps the wireless power transmitter 148 and the wireless communication transmitter 120 overlaps the wireless communication receiver 150. While the same separation distance D has been used as an example, the same physical separation may not be needed to allow the wireless power receiver 118 to receive energy 119 from the wireless power transmitter 148 and the wireless communication receiver 150 to receive communications from the wireless communication transmitter 120.

The wireless communication mechanism can differ from the wireless power mechanism to reduce interference with each other, especially so the wireless power mechanism does not interfere with the wireless communication mechanism. For example, the wireless power mechanism (e.g., wireless power receiver 118 and wireless power transmitter 148) may use inductive transmission and circuitry and wireless communication mechanism (e.g., wireless communication transmitter 120 and wireless communication receiver 150) may use optical signal transmission and circuitry, where the inductive energy transmission has minimal impact, if any impact, on the optical signal transmission.

Figure 2:
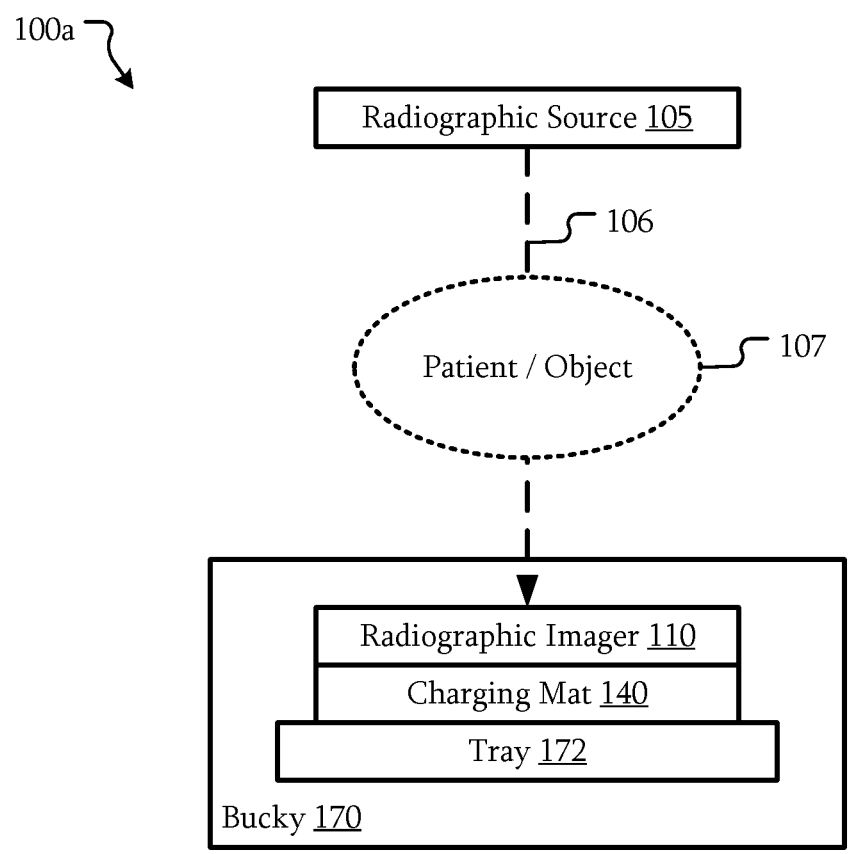
FIG. 2 is a block diagram of radiographic imaging system according to some embodiments.

FIG. 2 is a block diagram of radiographic imaging system according to some embodiments. Referring to FIGS. 1 and 2, in some embodiments, the radiographic imaging system 100a may be similar to the radiographic imaging system 100 of FIG. 1. Here, the imaging system 100a includes a radiographic source 105 and a bucky 170 including the radiographic imager 110 and a charging mat 140. The radiographic imager 110 and charging mat 140 may be similar to that described above with respect to FIG. 1. The radiographic source 105 is configured to generate a beam 106 of photons or charged particles. For example, the radiographic source 105 may include an x-ray tube, a linear accelerator, a radioisotope, or the like.

The bucky 170 is a structure configured to contain the radiographic imager 110 and the charging mat 140. For example, the bucky 170 may include a housing within which a slidable tray 172 is mounted. The tray 172 may be configured to slide in and out of the bucky 170 to allow access to the radiographic imager 110. The charging mat 140 and radiographic imager 110 are mounted, secured, or semi-permanently affixed on the tray 172. The charging mat 140 may be disposed on the tray 172. The radiographic imager 110 may be disposed on the charging mat 140. The radiographic imager 110 and the charging mat 140 may be disposed as described above such that energy may be wirelessly transferred to the radiographic imager 110 and communication may be received by the charging mat 140. The bucky 170 is disposed relative to radiographic source 105 such the beam 106 is projected towards the bucky 170 and, in particular, the radiographic imager 110. The beam 106 may pass through a patient or object 107 before being incident on the radiographic imager 110.

In some embodiments, due to the configuration described with respect to FIG. 1, an existing legacy radiographic imager (e.g., using a film cassette) may be removed and replaced with the charging mat 140 and the radiographic imager 110. The customer may avoid the cost of a new bucky 170 as the charging mat 140 and the radiographic imager 110 may be placed on the existing tray 172.

In some embodiments, the combination of the radiographic imager 110 and the charging mat 140 may have the same, similar, and/or smaller size than an existing or legacy radiographic imager designed to be placed on the tray 172. For example, a combined height of the radiographic imager 110 and the charging mat 140 may be less than about 20 millimeters (mm) or less than about 25 mm to allow the tray 172 to close without interference or contact with the radiographic imager 110 or the charging mat 140. For example, the radiographic imager 110 may have a height of about 20 mm while the charging mat 140 has a height of about 2 mm. In another example, the radiographic imager 110 may have a height of about 15 mm while the charging mat 140 has a height of about 4 mm, which may fit into a tray 172 with a space of 20 mm high. In various examples, the charging mat 140 can have a height less than 2.5 mm, 3 mm, 3.4 mm, 4 mm, 4.5 mm, or 5 mm.

In some embodiments, the communication link formed by the wireless communication transmitter 120 and the wireless communication receiver 150 may be used to disable the wireless charging by the wireless power transmitter 148 and the wireless power receiver 118. For example, outside of an exposure of the radiographic source 105 and the acquisition of an image by the radiographic imager 110, energy 119 may be transferred to the radiographic imager 110 as described above. In some embodiments, energy storage devices of the power system 116 may be charged during this period of an image acquisition.

When an image will be acquired, the control logic 114 may be configured to receive a command associated with acquiring an image using the imaging array 112. For example, that command may include a signal from an automatic exposure detection (AED) system, synchronized radiation modes, a command from an external computer operating the radiographic imaging system 100a, or the like.

In response to the command, the control logic 114 may be configured to transmit a command to the charging mat 140 through the wireless communication transmitter 120. The charging mat 140 is configured to receive the command through the wireless communication receiver 150. Thus, the control logic 114 may receive the command from the radiographic imager 110.

In response to the command from the radiographic imager 110, the control logic 144 may be configured to stop the wireless power transmitter 148 from transmitting energy 119 before the radiographic imager 110 acquires an image. The imaging array 112 may experience significant interference in image acquisition and transfer as the wireless energy transmission frequencies may both interfere with image capture and transmission, which can impact image quality and/or data loss. By stopping the wireless transmission of energy, the interference may be reduced or eliminated.

In some embodiments, the power system 116 may include energy storage devices such as batteries, capacitors, super capacitors, or the like. In some embodiments, the power system 116 does not include a battery or other larger capacity energy storage devices. In other embodiments, the power system 116 may use a larger capacity energy storage device, like a battery, and a smaller capacity energy storage device, like a capacitor or super capacitors, and may switch between the energy storage devices depending on the circumstances and the control logic 114. For example, the smaller capacity energy storage device may operate with the larger energy storage device is removed or being swapped out. The power system 116 may include energy storage devices, such as smaller capacity energy storage devices, that have an insufficient energy to allow the radiographic imager 110 to operate over multiple cycles, multiple images, throughout a day, or the like, such as consecutive images acquired during video imaging. However, the energy storage devices may have a sufficient energy to allow the radiographic imager 110 to operate without other power inputs during an acquisition of a single image or the acquisition of multiple images of a single patient or object 107. That is, the energy storage devices may have a sufficient amount of energy to operate the radiographic imager 110 through an acquisition of an image when the wireless power transmission is paused, but not enough to operate through a subsequent image acquisition or enough to operate while the radiographic imaging system 110a is prepared for imaging a new patient or object. For example, before acquiring an image, energy 119 is transferred to the radiographic imager 110. This energy 119 may charge the energy storage device of the power system 116. During the acquisition of an image, transfer of the energy 119 may be disabled. However, the power system 116 may be configured to supply power to the radiographic imager 110 from the energy storage device.

Once the acquisition of one or more images has finished, the control logic 114 may be configured to transmit a command to the charging mat 140 through the wireless communication transmitter 120 and wireless communication receiver 150 indicating that the transfer of energy 119 may resume. During this time the energy used during the exposure may be replenished.

In some embodiments, an amount of electromagnetic interference (EMI) shielding may be reduced or omitted from the radiographic imager 110. As the transfer of energy may be a source of interference during the acquisition of an image, the pausing of the energy transfer may reduce and/or eliminate the interference, reducing or eliminating a need for EMI shielding to shield the imaging array 112 from that interference.

In some embodiments, the radiographic imager 110 and charging mat 140 may be added to the bucky 170 as a retrofit of an existing system. As will be described in further detail below, the radiographic imager 110 and charging mat 140 may be configured to mount on the existing tray 172. Thus, a purchase of a new bucky 170 may be omitted.

In addition, in some embodiments, the use of the radiographic imager 110 and charging mat 140 may improve throughput and/or workflow. As described above, in some embodiments, the radiographic imager 110 may be charged in the bucky 170. While the charging may be stopped occasionally, the charge of the radiographic imager 110 may be maintained so that the radiographic imager 110 may remain in the bucky 170 for a longer period of time. That is, the radiographic imager 110 may not need to be removed to replace a battery or may be removed less frequently to maintain a full charge in the radiographic imager 110. As a result, this maintenance time will be reduced or eliminated from the workflow.

The radiographic imaging system 100a may take a variety of forms. For example, the radiographic imaging system 100a may include a c-arm with the radiographic source 105 and the bucky mounted on different ends. In other embodiments, the bucky 170 may be under a patient bed, on a vertical stand, or the like. In other embodiments, the radiographic imaging system 100a may include a mobile cart. For example, the charging mat 140 may be disposed in a pocket, drawer, or other portion of the mobile cart. The radiographic image 110 may be placeable on the charging mat 140.

Figure 3:
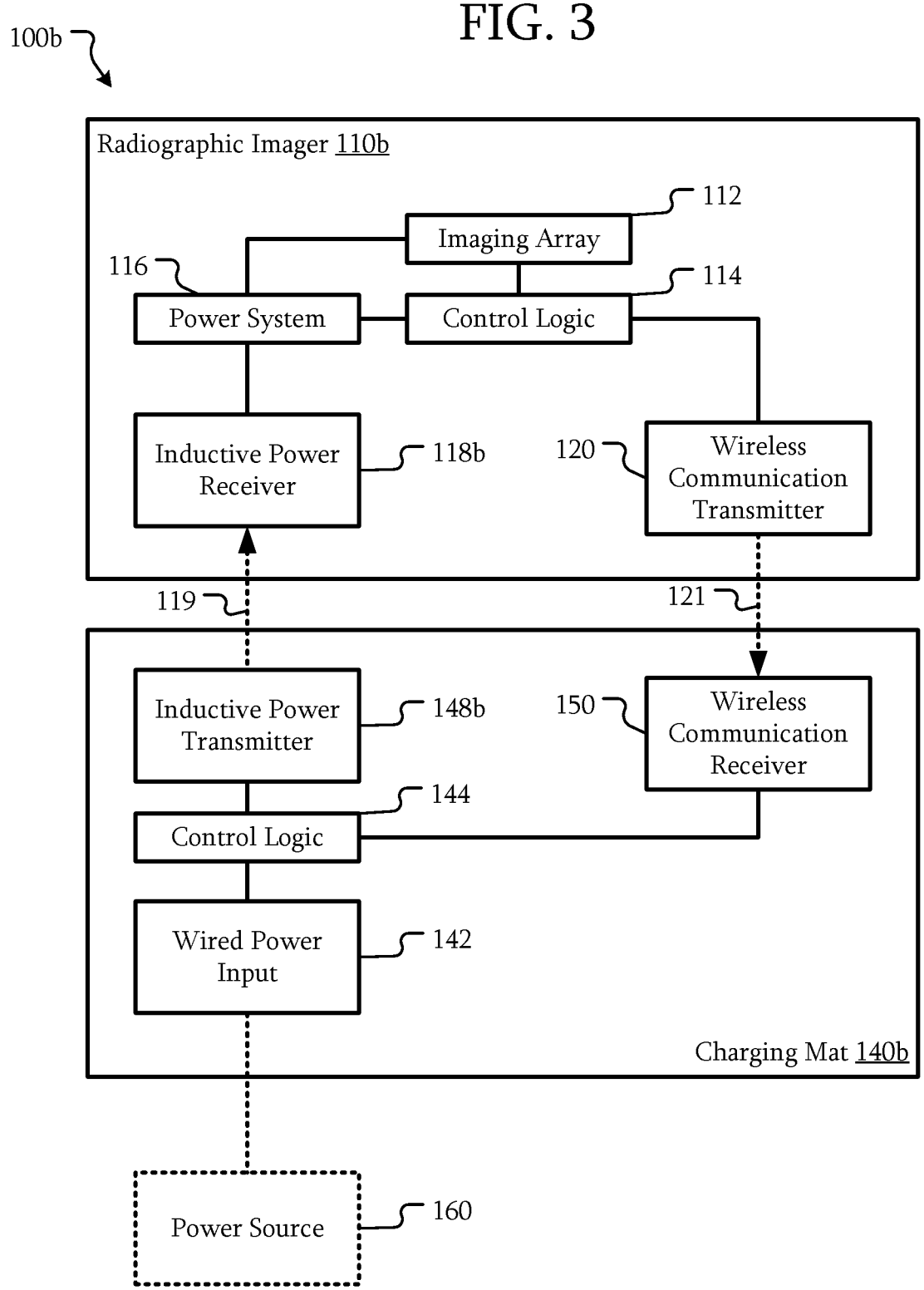
FIGS. 3 and 4 are block diagrams of radiographic imaging systems according to some other embodiments.
Figure 4:
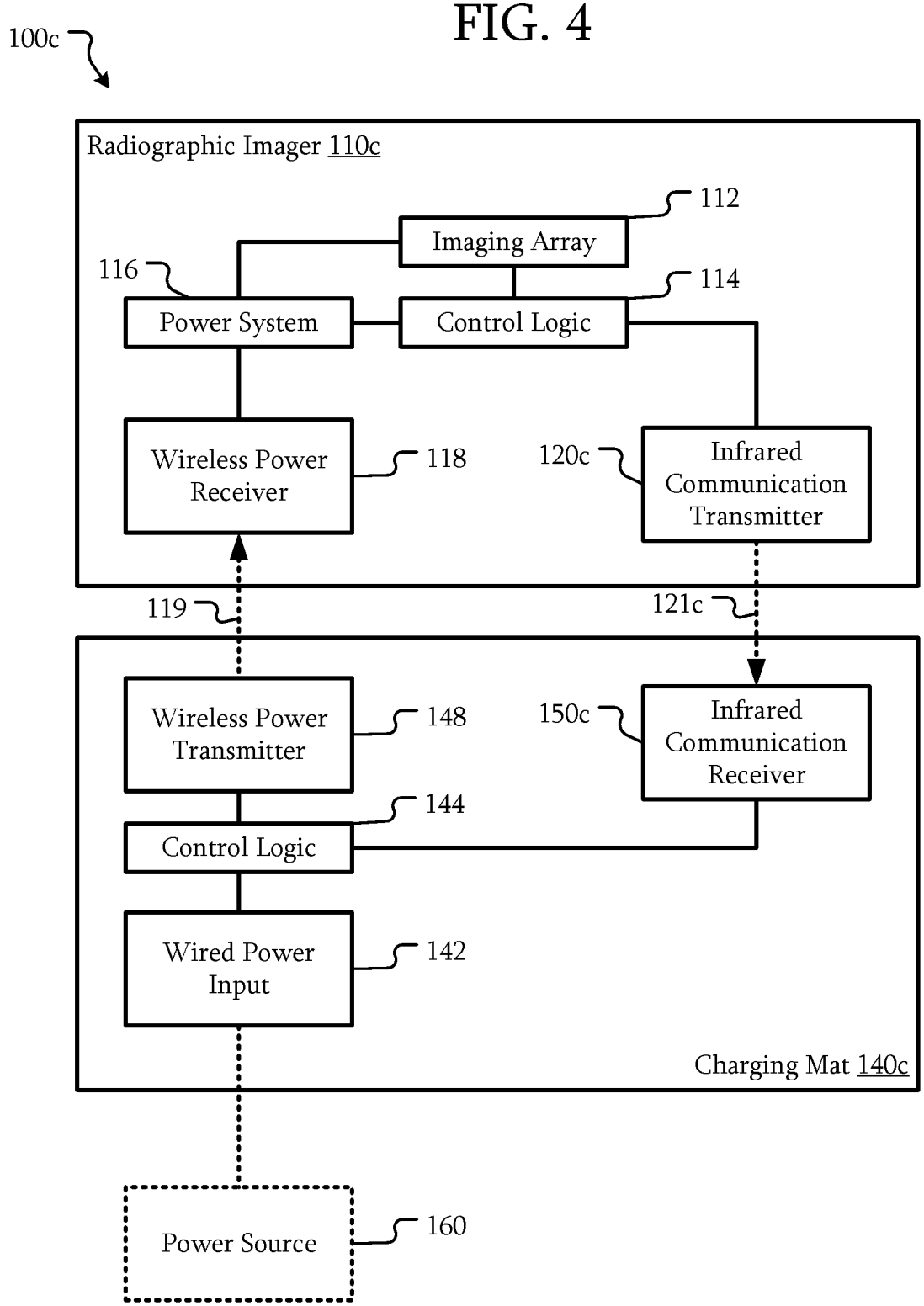

FIGS. 3 and 4 are block diagrams of radiographic imaging systems according to some other embodiments. Referring to FIG. 3, the radiographic imaging system 100b may be similar to the radiographic imaging system 100 and include similar components. However, the radiographic imager 110b and the charging mat 140b include an inductive power receiver 118b and an inductive power transmitter 148b, respectively. The inductive power receiver 118b and the inductive power transmitter 148b may include wire coils, antennas, oscillators, rectifiers, or the like to enable the transfer of energy.

Referring to FIG. 4, the radiographic imaging system 100c may be similar to the radiographic imaging system 100 or 100b and include similar components. However, the radiographic imager 110c and the charging mat 140c include an optical communication transmitter and an optical communication receiver, such as the IR communication transmitter 120c and the IR communication receiver 150c, respectively. The optical communication transmitter includes an optical emitter, such as an optical photodiode, and associated modulation circuitry to transmit an optical signal in response to the control logic 144. The optical communication receiver includes corresponding components such as an optical photodiode and associated demodulation circuitry to receive the optical signal and communicate that signal to the control logic. The IR communication transmitter 120c includes an IR emitter, such as an IR photodiode, and associated modulation circuitry to transmit an IR signal 121c in response to the control logic. The IR communication receiver 150c includes corresponding components such as an IR photodiode and associated demodulation circuitry to receive the IR signal 121c and communicate that signal to the control logic 144.

In some embodiments, the communication of control signals from the radiographic imager 110c to the charging mat 140c may be performed only through a communication link formed by the IR communication transmitter 120c and the IR communication receiver 150c. In some embodiments, the communication of these control signals may be only unidirectional. That is, the charging mat 140c may not communicate control signals to the radiographic imager 110c.

In other embodiments, the charging mat 140c may communicate some control signals to the radiographic imager 110c; however, those control signals may be limited to negotiation between the wireless power receiver 118 and the wireless power transmitter 148. Other control signals such as whether to enable or disable the transfer of energy, may be communicated only unidirectionally through the IR communication transmitter 120c and the IR communication receiver 150c.

Figure 5:
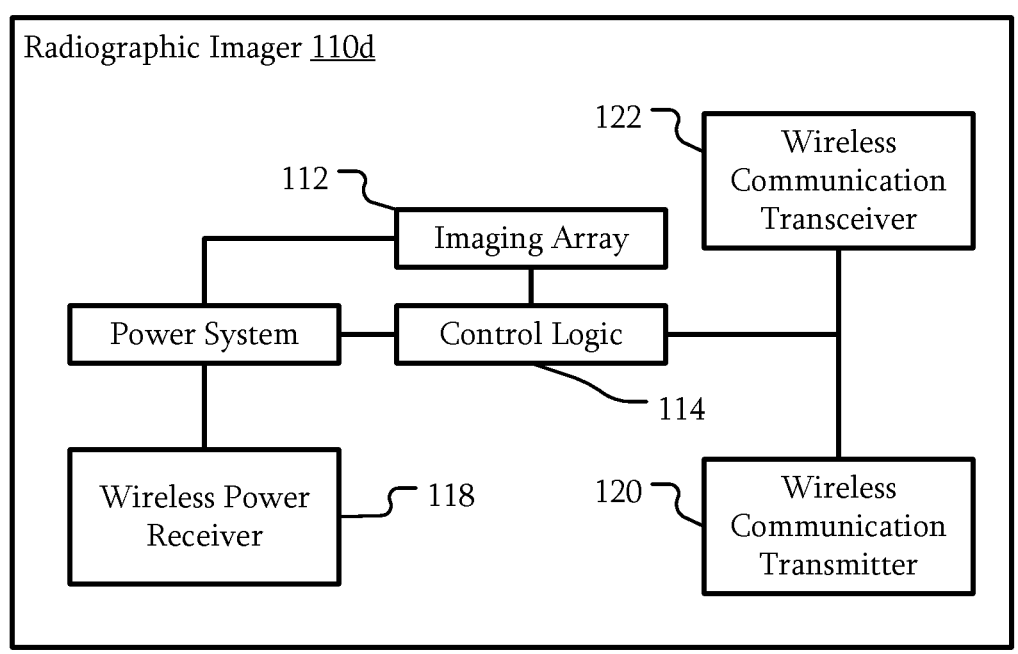
FIG. 5 is a block diagram of a radiographic imager according to some embodiments.

FIG. 5 is a block diagram of a radiographic imager according to some embodiments. The radiographic imager 110d may be similar to the radiographic imager 110, 110b, and 110c described above. However, the radiographic imager 110d includes a wireless communication transceiver 122. The wireless communication transceiver 122 is a wireless communication circuit such as a WiFi transceiver, a Bluetooth transceiver, or the like. The control logic 114 may be configured to communicate data from the imaging array 112 through the wireless communication transceiver 122. The control logic 114 may be configured to receive command and/or control information through the wireless communication transceiver 122. For example, the control logic 114 may receive a command to begin an acquisition of an image through the wireless communication transceiver 122. Image data from that acquisition, whether in a raw format or processed in some manner, may be transmitted through the wireless communication transceiver 122.

In some embodiments, the wireless communication transceiver 122 is separate from the wireless communication transmitter 120. For example, as described above, the wireless communication transceiver 122 may include a WiFi transceiver while the wireless communication transmitter 120 may include an IR transmitter.

Figure 6:
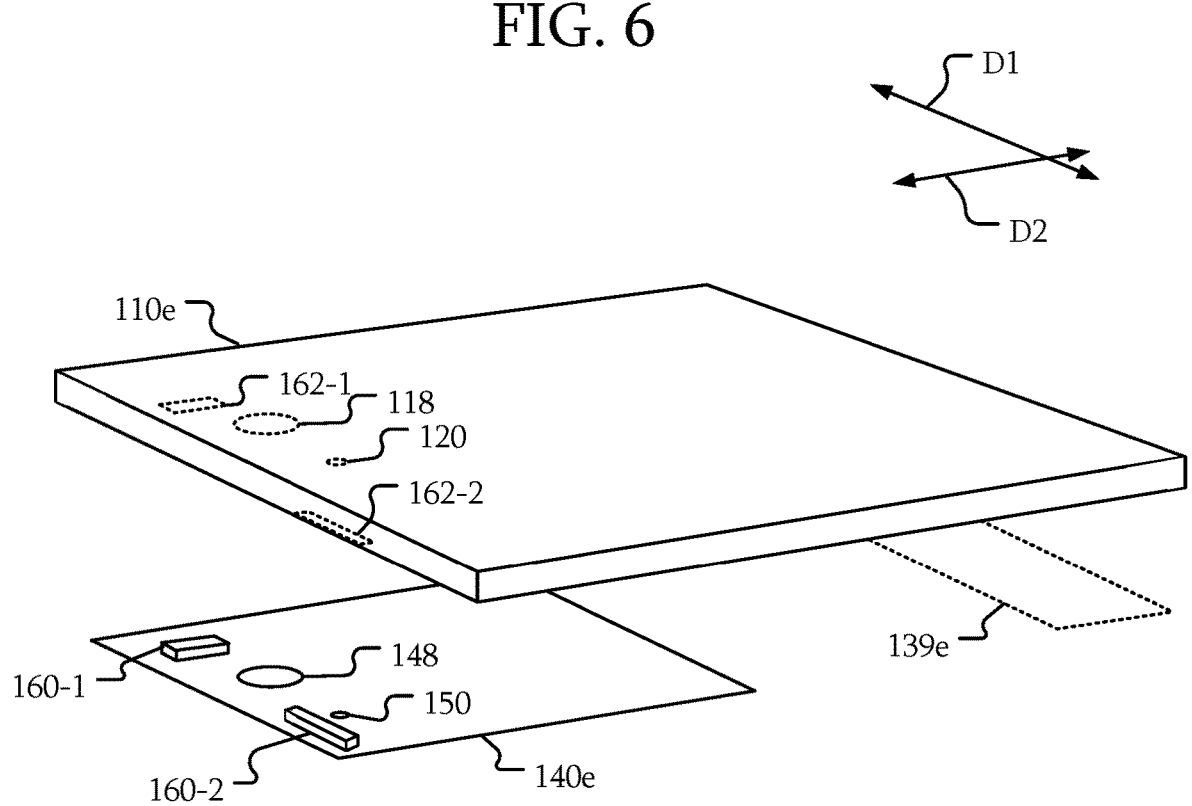
FIG. 6 is a block diagram of a radiographic imager and charging mat with alignment structures according to some embodiments.

FIG. 6 is a block diagram of a radiographic imager and charging mat with alignment structures according to some embodiments. As described above, the radiographic imager 110 and charging mat 140 may be aligned to enable power and communications. The radiographic imager 110e may be similar to the radiographic imager 110, 110b, 110c, and 110d described above. The charging mat 140e may be similar to the charging mat 140, 140b, and 140c described above. However, each of the radiographic imager 110e and the charging mat 140e includes alignment structures 160 or 162.

The alignment structures 160 and 162 may take a variety of forms. The alignment structures 160 and 162 may include physical structures that constrain movement through contact, magnetic structures that constrain movement through magnetic attraction and/or repulsion, or the like. The charging mat 140 may include an exterior material to help resist movement of the charging mat 140 on the tray 172 and/or the radiographic imager 110 on the charging mat 140, such as a slip resistant material or a material with a relatively high coefficient of friction.

As illustrated, the charging mat 140e includes two alignment structures 160-1 and 160-2. The radiographic imager 110e includes corresponding alignment structures 162-1 and 162-2. These alignment structures 160 and 162 may, when mated, constrain the movement of the radiographic imager 110e relative to the charging mat 140e to maintain the alignment of the wireless power receiver 118 and the wireless power transmitter 148 and the alignment of the wireless communication transmitter 120 and the wireless communication receiver 150. For example, the alignment structures 160-1 and 162-1 may constrain the relative movement along direction D1 while the alignment structures 160-2 and 162-2 constrain the relative movement along direction D2. The degree of alignment provided by the alignment structures 160 and the alignment structures 162 may be sufficient enable the transfer of power using the wireless power receiver 118 and the wireless power transmitter 148 and the communications using the wireless communication transmitter 120 and the wireless communication receiver 150. That is, the alignment may, but need not be exact.

While two alignment structures have been used as an example in each of the radiographic imager 110e and the charging mat 140e, in other embodiments, the number of alignment structures may be different, including being a different number between the radiographic imager 110e and the charging mat 140e. For example, the radiographic imager 110e and the charging mat 140e may each have only one alignment structure. That alignment structure may have a shape, such as a cross, that may constrain movement in both directions D1 and D2. In another example, the charging mat 140e may include multiple alignment structures 160 while the radiographic imager 110e includes a smaller number of alignment structures 162. Those alignment structures 162 may match with corresponding alignment structures 160. The additional alignment structures 160 of the charging mat 140e may allow different radiographic imager 110e with different alignment structures 162 to be placed on the same charging mat 140e. While the alignment structures 160 and the alignment structures 162 have been illustrated as the alignment structures 160 extending from the charging mat 140e into the radiographic imager 110e, in other embodiments, the particular form of the alignment structures 160 and the alignment structures 162 may be different.

In some embodiments, the wireless communication transmitter 120 and the wireless communication receiver 150 may be used to facilitate alignment. For example, a signal strength received by the wireless communication receiver 150 may be communicated from the charging mat 140e to a technician aligning the radiographic imager 110e. In some embodiments, feedback such as a visual or audible indication may indicate the signal strength to the technician.

In some embodiments, the charging mat 140e may be smaller than the radiographic imager 110e. A corresponding spacer 139e may be included with the charging mat 140e to level the radiographic imager 110e such as when the radiographic imager 110e and charging mat 140e are placed in a bucky 170 as described above.

Figure 7A:
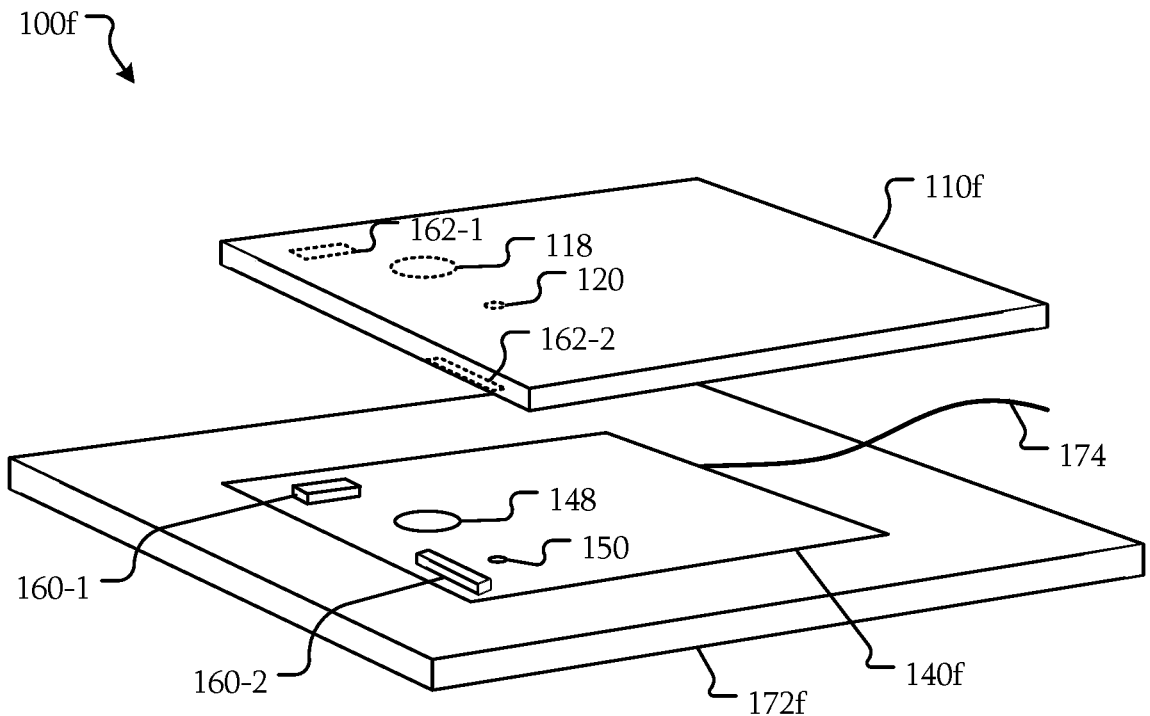
FIGS. 7A-7B are block diagrams of radiographic imagers and charging mats mounted on a bucky tray with alignment structures according to some embodiments.
Figure 7B:
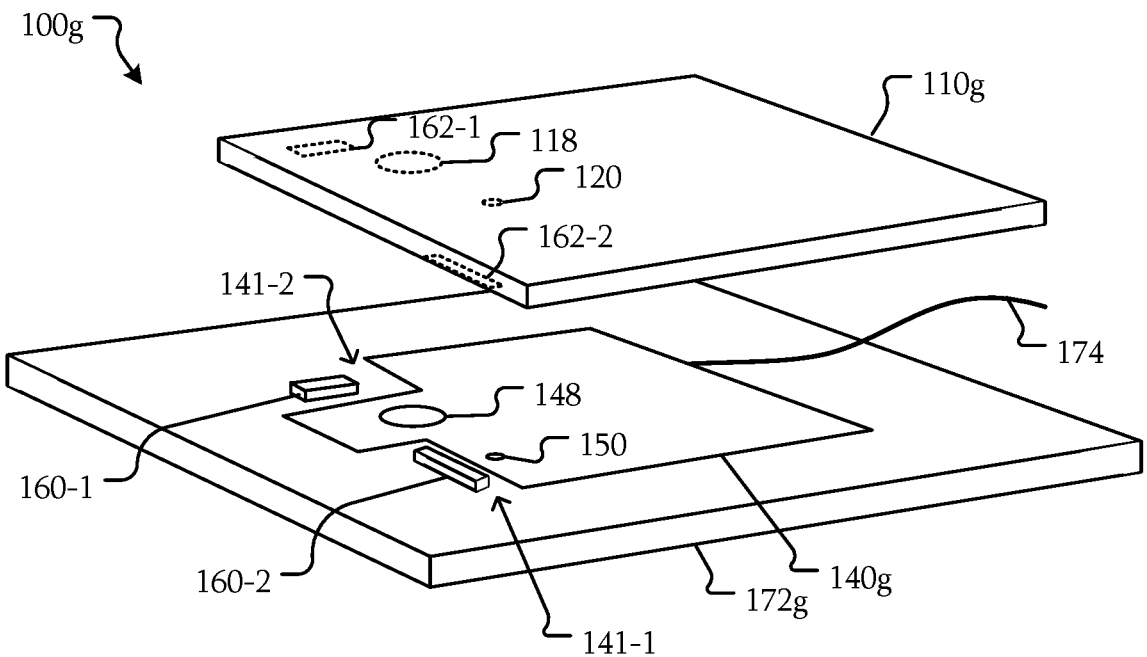

FIGS. 7A-7B are block diagrams of radiographic imagers and charging mats mounted on a bucky tray with alignment structures according to some embodiments. Referring to FIG. 7A, the radiographic imaging system 100f includes a radiographic imager 110f and a charging mat 140f. The radiographic imager 110f and a charging mat 140f may be similar to those described above. The charging mat 140f may be mounted on the tray 172f. The charging mat 140f may be mounted in a variety of ways, such as by fasteners, magnets, adhesives, friction features, or the like.

The charging mat 140f may include a power cable 174. The power cable 174 may be routed in, on, and/or around the tray 172f and the bucky 170 (as illustrated in FIG. 2) to an appropriate connection to a power supply 160 (as illustrated in FIGS. 1, 3-5). The power cable 174 may include a flexible cable, a retractable cable, a semi-rigid cable carrier, or the like. In some embodiments, the power cable 174 may include or be connected to a connector that makes an electrical connection for the transfer of power when the tray 172f is moved into the bucky 170. In other embodiments, the power cable 174 may be configured to connected to the power supply 160 and still accommodate movement of the tray 172f.

When the charging mat 140f and the radiographic imager 110f are mounted on the tray 172f, the combined height of the charging mat 140f and the radiographic imager 110f may be less than or equal to the height of another radiographic imager designed to be mounted on that 172f and the corresponding bucky 170. In some embodiments, the combination of the charging mat 140f and the radiographic imager 110f may be used as a drop in replacement of that other radiographic imager without replacement of the tray 172f or replacement of the bucky 170.

Referring to FIG. 7B, the radiographic imaging system 100g may be similar to the radiographic imaging system 100f. However, the charging mat 140g includes at least one cutout 141. Here, two cutouts 141-1 and 141-2 are used as an example; however, in other embodiments, the number, the location, the shape, or the like make be different. In addition, while the cutouts 141 are illustrated as being on a perimeter of the charging mat 140f, in other embodiments, the cutouts 141 may be within the charging mat 140f, i.e., the charging mat 140f may extend around the cutout 141.

The cutouts 141 are disposed such that the cutouts permit the alignment structures 162 of the tray 172g to mate with the alignment structures 160. As a result, when the radiographic imager 110g is aligned to the tray 172g such that the wireless power receiver 118 is aligned with the wireless power transmitter 148 of the charging mat 140g and the wireless communication receiver 150 is aligned with the wireless communication transmitter 120 of the radiographic imager 110g, the at least one cutout is aligned with the alignment structures 160 and 162 to permit the alignment structures 160 and 162 to mate.

In some embodiments, the location of the cutouts 141 on the charging mat 140g may correspond to the alignment structures 160 and 162 of multiple different radiographic imager 110 and trays 172. As a result, the charging mat 140g may be placed on a variety of different trays 172f with different placements of alignment structures 160.

In some embodiments, as illustrated, the charging mat 140 may take up less than all of the available space on the tray 172. However, in other embodiments, the charging mat 140 may take of all of the space on a planar surface on the tray 172.

Figure 8:
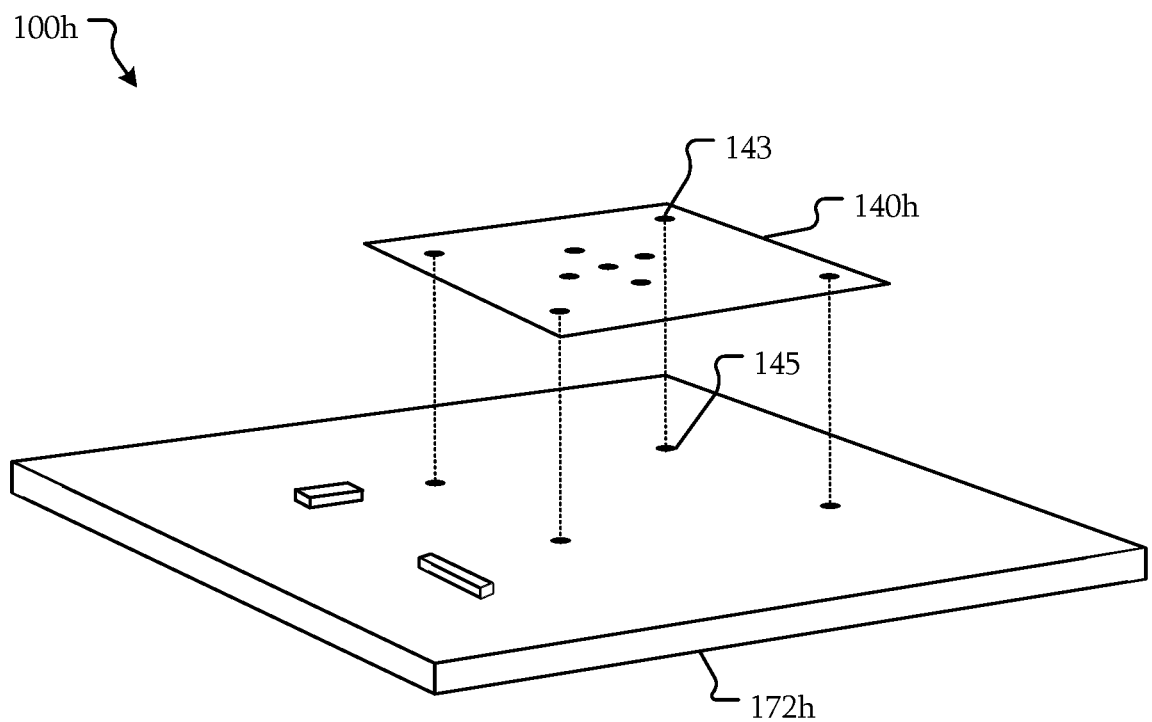
FIG. 8 is a block diagram of a charging mat with multiple fastening structures and a bucky tray according to some embodiments.

FIG. 8 is a block diagram of a charging mat with multiple fastening structures and a bucky tray according to some embodiments. In some embodiments, the radiographic imaging system 100h includes a tray 172h and a charging mat 140h. The tray 172h and charging mat 140h may be similar to the tray 172 and charging mat 140 described above. However, the charging mat 140h includes multiple fastening structures 143 and the tray 172h includes at least one fastening structures 145. The fastening structures 143 and 145 are structures configured to attach the charging mat 140h to the tray 172h. For example, the fastening structure 143 may include a through hole and the fastening structure 145 may include a threaded hole to permit a screw to be used to attach the charging mat 140h to the tray 172h. While a screw and corresponding threaded and non-threaded holes has been used as an example, in other embodiments, other fastening techniques may be used, such as brads, retainers, clips, rivets, adhesives, or the like.

In some embodiments, the number of fastening structures 143 is greater than the number of fastening structures 145. In particular, the charging mat 140h may be designed to be mounted on a variety of different trays 172h, each with different fastening structures 145, different placement of fastening structures 145, or the like. As illustrated, the charging mat 140h has nine fastening structures 143 while the tray 172h has four fastening structures 145. However, four of the nine fastening structures 143 are disposed in location on the charging mat 140h such that they align with the four fastening structures 145 of the tray 172h. Although a charging mat 140h having fastening structures 143 that correspond to each of the fastening structure 145 of the tray 172h has been used as an example, in other embodiments, less than all of the fastening structures 145 may correspond to fastening structures 143. However, the fastening structures 145 that do correspond to fastening structures 143 may be used to mount the charging mat 140h on the tray 172h.

Figure 9:
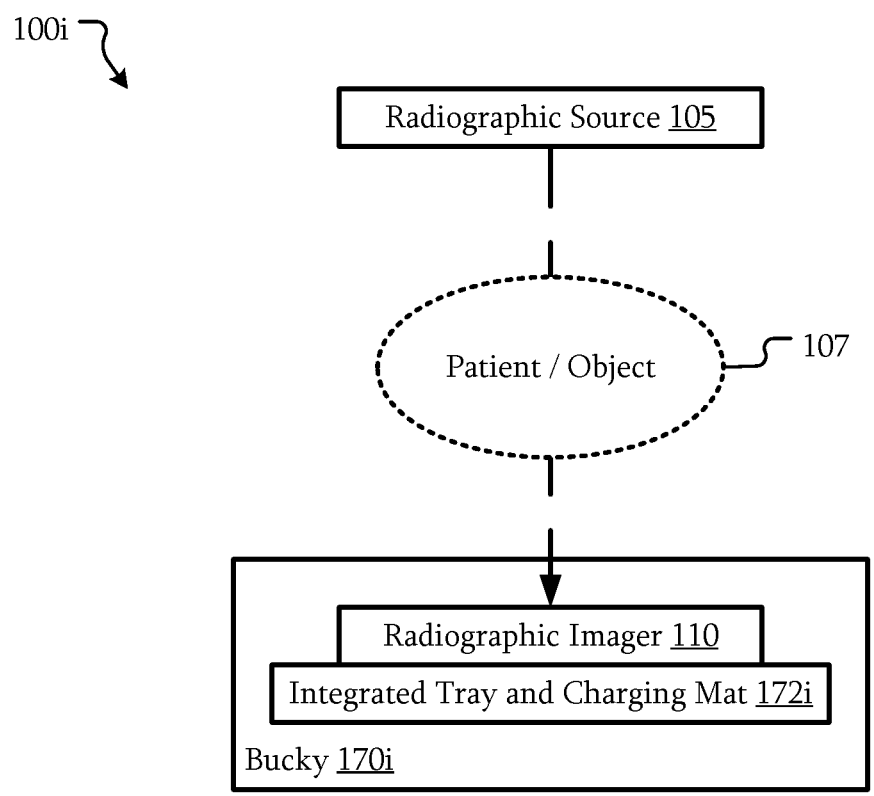
FIG. 9 is a block diagram of radiographic imaging system according to some embodiments.

FIG. 9 is a block diagram of radiographic imaging system according to some embodiments. The radiographic imaging system 100i is similar to the radiographic imaging system 100a described above. However, the radiographic imaging system 100i includes a bucky 170i with an integrated tray and charging mat 172i (referred to as the integrated tray 172i). The integrated tray 172i has the components of a charging mat 140 and the tray 172 integrated as a single assembly. In some embodiments, the integrated tray 172i may be used as a replacement for an existing tray of a bucky.

Figure 10A:
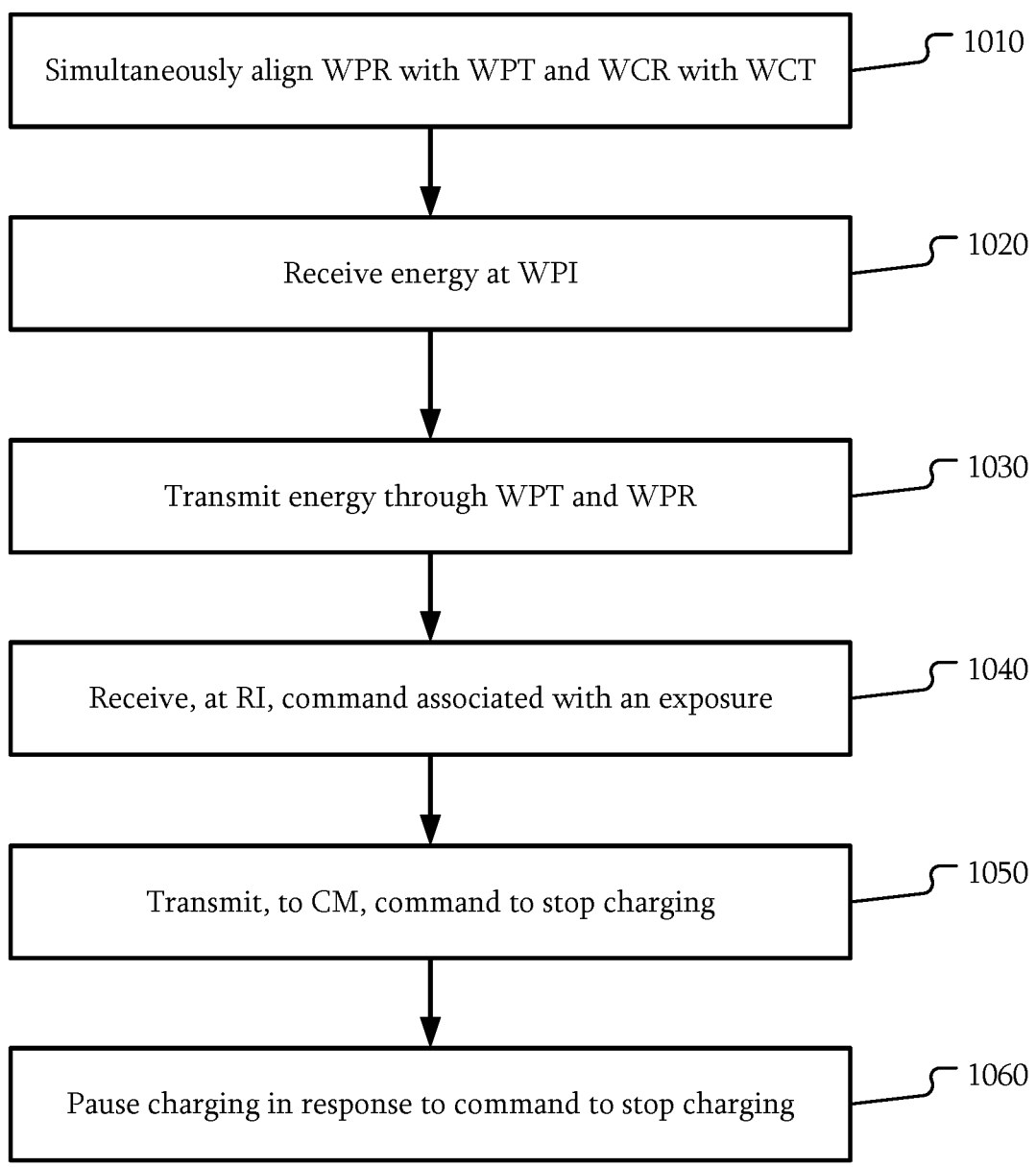
FIGS. 10A-10C are flowchart of methods of using a radiographic imaging system according to some embodiments.
Figure 10B:
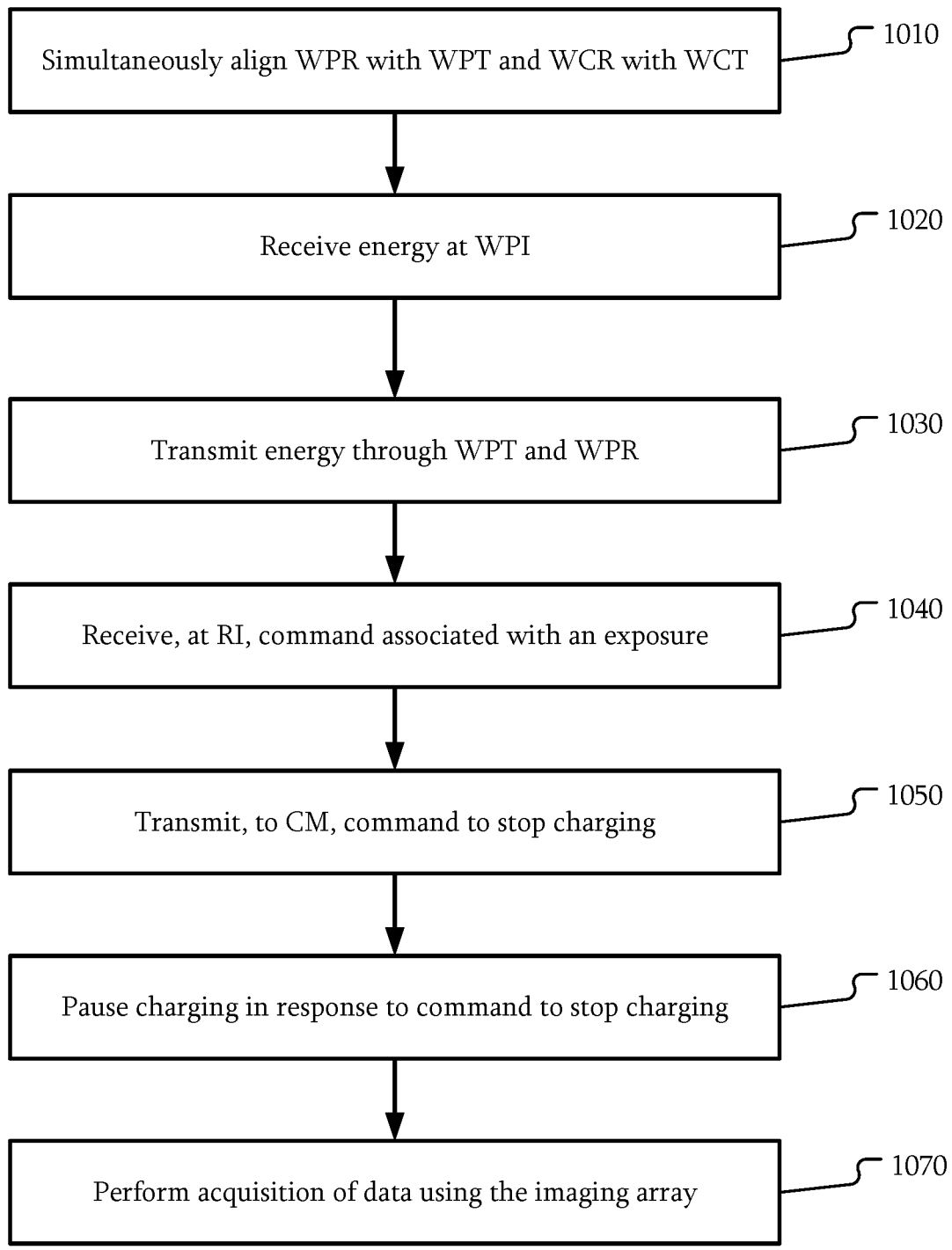

FIGS. 10A-10B are flowchart of methods of using a radiographic imaging system according to some embodiments. Referring to FIG. 10A, in 1010, a wireless power receiver (WPR) of a radiographic imager is aligned with a wireless power transmitter (WPT) of a charging mat simultaneously as a wireless communication receiver (WCR) of the charging mat is aligned with a wireless communication transmitter (WCT) of the radiographic imager. For example, as described above, by mounting a radiographic imager 110 on a charging mat 140 as described above, a wireless power receiver 118 is aligned with the wireless power transmitter 148 and the wireless communication transmitter 120 is aligned with the wireless communication receiver 150.

In some embodiments, aligning the wireless power receiver, wireless power transmitter, wireless communication receiver, and wireless communication transmitter may include aligning the radiographic imager and the charging mat in response to a signal received by the wireless communication receiver from the wireless communication transmitter. For example, the radiographic imager 110 and the charging mat 140 may be operating. The charging mat 140 may include a user interface, including a visual or audio indicator. As the radiographic imager 110 is moved into alignment, the indicator of the charging mat 140 may change state, change intensity, change tone, change volume, or the like to indicate the quality of the alignment in response to the received signal. In a particular example, the change may be based on an intensity of a received signal, an error rate of a received signal, or other parameter that indicates a quality of the communication from the wireless communication transmitter 120 to the WCT 150.

In 1020, energy is received at a wired power input (WPI) of the charging mat. For example, the power source 160 supplied power to the charging mat 140 that is received at the wired power input 142.

In 1030, energy is transmitted from the charging mat to a power system of the radiographic imager through the wireless power transmitter and the wireless power receiver. For example, the wireless power transmitter 148 may generate energy 119 that is transmitted wirelessly to the wireless power receiver 118.

In 1040, a first command associated with an exposure of an imaging array of the radiographic imager is received, at the radiographic imager. For example, referring to FIGS. 5 and 10A, a command may be sent to the radiographic imager (RI) 110 through the wireless communication transceiver 122. The command may be processed by the control logic 114.

In 1050, a second command to stop charging during the exposure is transmitted from the radiographic imager to the charging mat through the wireless communication transmitter and the wireless communication receiver. For example, the control logic 114 may generate the command. The control logic 114 may control the wireless communication transmitter 120 to transmit the command wirelessly to the wireless communication receiver 150 of the charging mat 140. The command is received by the wireless communication receiver 150 and processed by the control logic 144.

In 1060, the transmission of energy from the charging mat to the power system of the radiographic imager is paused in response to the second command. For example, in response to receiving the command, the control logic 144 may control the wireless power transmitter 148 pause the transmission of the power 119.

Referring to FIG. 10B, the operations may be similar to that described with respect to FIG. 10A. In 1070, an imaging array is used to acquire data. In particular, the data is acquired while the transmission of energy 119 is paused. As a result, interference due to the transmission of the energy 119 may be reduced or eliminated.

Figure 10C:
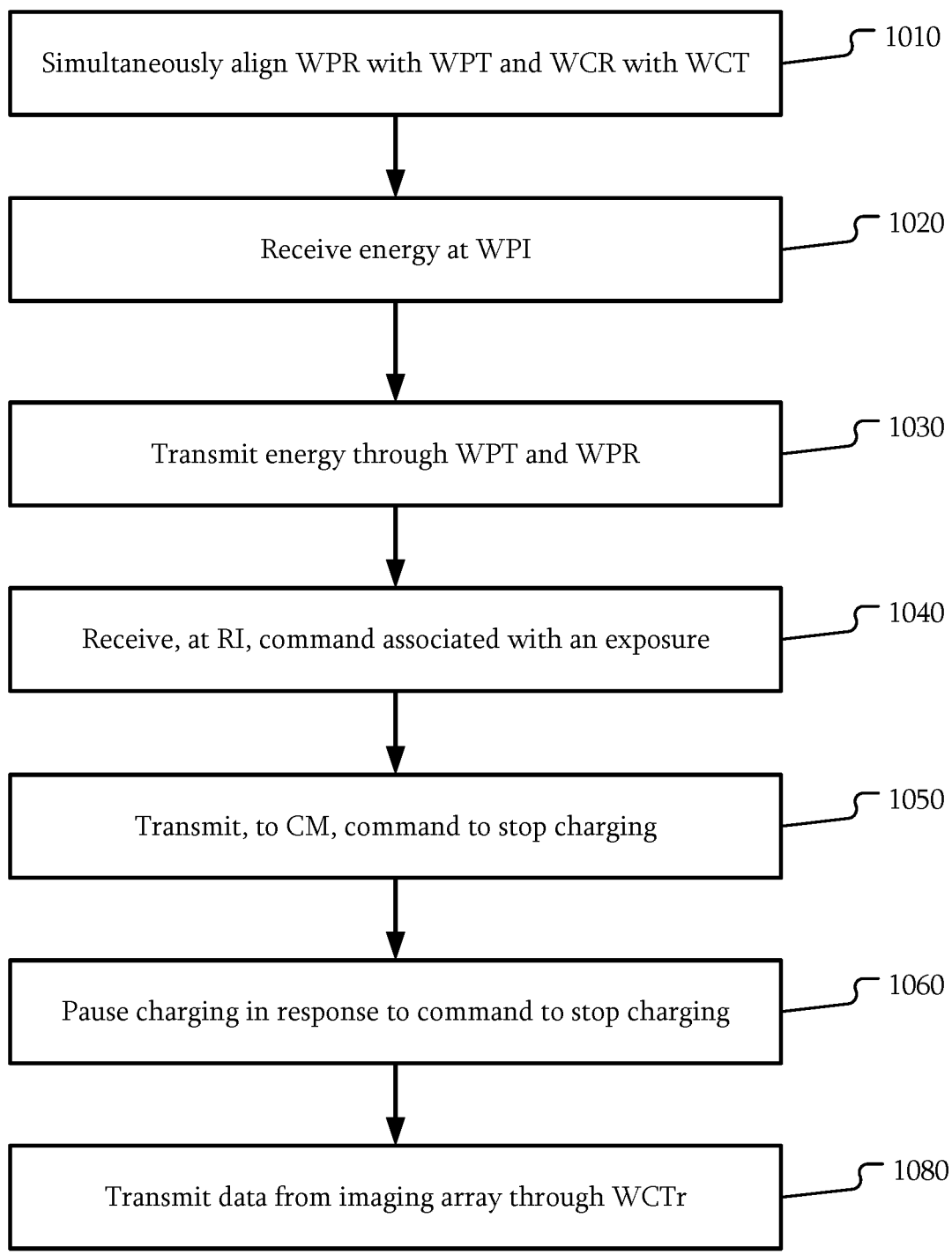

Referring to FIG. 10C, the operations may be similar to that described with respect to FIGS. 10A and 10B. In 1080, data from an imaging array of the radiographic imager is transmitted through a wireless communication transceiver (WCTr) of the radiographic imager separate from the wireless communication transmitter. For example, the control logic 114 may control the imaging array 112 to acquire data. The data may be transmitted by the control logic 114 to an external computer through the wireless communication transceiver 122.

Some embodiments include a radiographic imaging system, comprising: a radiographic imager 110, 110*b*, 110*c*, 110*d*, 110*e*, 110*f*, 110*g*, including: an imaging array 112; imager control logic 114 configured to control the imaging array 112; a power system 116 configured to supply power to at least the imaging array 112 and the imager control logic 114; a wireless power receiver 118 configured to receive energy wirelessly and provide at least part of that energy to the power system 116; and a wireless communication transmitter 120; and a charging mat 140, 140*b*, 140*c*, 140*e*, 140*f*, 140*g*, including: a wired power input 142; a wireless power transmitter 148 configured to transmit energy wirelessly; and a wireless communication receiver 150; wherein the wireless power receiver 118, the wireless power transmitter 148, the wireless communication receiver 150, and the wireless communication transmitter 120 are positioned such that the radiographic imager 110, 110*b*, 110*c*, 110*d*, 110*e*, 110*f*, 110*g* can be placed on the charging mat 140, 140*b*, 140*c*, 140*e*, 140*f*, 140*g* where, simultaneously, the wireless power receiver 118 is aligned with the wireless power transmitter 148 and the wireless communication receiver 150 is aligned with the wireless communication transmitter 120.

In some embodiments, the charging mat 140, 140*b*, 140*c*, 140*e*, 140*f*, 140*g* further comprises charging mat 140, 140*b*, 140*c*, 140*e*, 140*f*, 140*g* control logic; the imager control logic 114 is configured to receive a command associated with an exposure of the imaging array 112; and the charging mat 140, 140*b*, 140*c*, 140*e*, 140*f*, 140*g* control logic is configured to receive a command from the imager control logic 114 to stop the wireless power transmitter 148 from transmitting energy during the exposure.

In some embodiments, the wireless power transmitter 148 and the wireless power receiver 118 comprise an inductive power transmitter 148*b* and an inductive power receiver 118*b*, respectively.

In some embodiments, wireless communication receiver 150 and the wireless communication transmitter 120 comprise an optical communication receiver 150*c* and an optical communication transmitter 120*c*, respectively.

In some embodiments, wireless communication receiver 150 and the wireless communication transmitter 120 comprise a unidirectional communication link.

In some embodiments, the radiographic imager 110, 110*b*, 110*c*, 110*d*, 110*e*, 110*f*, 110*g* further comprises a wireless communication transceiver 122 wherein the imager control logic 114 is configured to communicate data from the imaging array 112 through the wireless communication transceiver 122; and the wireless communication transceiver 122 is separate from the wireless communication transmitter 120.

In some embodiments, the radiographic imager 110, 110*b*, 110*c*, 110*d*, 110*e*, 110*f*, 110*g* comprises at least one first alignment structure 162; the charging mat 140, 140*b*, 140*c*, 140*e*, 140*f*, 140*g* includes at least one second alignment structure 160; and when the at least one first alignment structure 162 and the at least one second alignment structure 160 are mated, the wireless power receiver 118 is aligned with the wireless power transmitter 148 and the wireless communication receiver 150 is aligned with the wireless communication transmitter 120.

In some embodiments, the radiographic imager 110, 110*b*, 110*c*, 110*d*, 110*e*, 110*f*, 110*g* comprises at least one alignment structure 162; the charging mat 140, 140*b*, 140*c*, 140*e*, 140*f*, 140*g* includes at least one cutout 141; and when the wireless power receiver 118 is aligned with the wireless power transmitter 148 and the wireless communication receiver 150 is aligned with the wireless communication transmitter 120, the at least one cutout 141 is aligned with the at least one alignment structure 162.

In some embodiments, the charging mat 140, 140*b*, 140*c*, 140*e*, 140*f*, 140*g* includes a plurality of first fastening structures 143; the radiographic imaging system further comprises a tray 172, 172*h*, 172*i* including at least one second fastening structure 145; the number of first fastening structures 143 is greater than the number of the at least one second fastening structure 145; and the charging mat 140, 140*b*, 140*c*, 140*e*, 140*f*, 140*g* is attached to the tray with at least one of the first fastening structures 143 and the at least one second fastening structure 145.

In some embodiments, the radiographic imaging system further comprises a radiographic source 105; and a bucky 170, 170*i*; wherein: the tray 172, 172*h*, 172*i* is a slidable portion of the bucky; the radiographic imager 110, 110*b*, 110*c*, 110*d*, 110*e*, 110*f*, 110*g* is disposed on the charging mat 140, 140*b*, 140*c*, 140*e*, 140*f*, 140*g* on the tray 172, 172*h*, 172*i*; and the radiographic source 105 is positionable to project radiation towards the bucky 170, 170*i*.

In some embodiments, the radiographic imaging system further comprises a bucky 170*i* configured to receive the radiographic imager 110, 110*b*, 110*c*, 110*d*, 110*e*, 110*f*, 110*g*; and the charging mat 140, 140*b*, 140*c*, 140*e*, 140*f*, 140*g* is integrated with the bucky 170*i*.

Some embodiments include a method, comprising: simultaneously aligning a wireless power receiver 118 of a radiographic imager 110, 110*b*, 110*c*, 110*d*, 110*e*, 110*f*, 110*g* with a wireless power transmitter 148 of a charging mat 140, 140*b*, 140*c*, 140*e*, 140*f*, 140*g* and a wireless communication receiver 150 of the charging mat 140, 140*b*, 140*c*, 140*e*, 140*f*, 140*g* with a wireless communication transmitter 120 of the radiographic imager 110, 110*b*, 110*c*, 110*d*, 110*e*, 110*f*, 110*g*; receiving energy at a wired power input 142 of the charging mat 140, 140*b*, 140*c*, 140*e*, 140*f*, 140*g*; transmitting energy from the charging mat 140, 140*b*, 140*c*, 140*e*, 140*f*, 140*g* to a power system 116 of the radiographic imager 110, 110*b*, 110*c*, 110*d*, 110*e*, 110*f*, 110*g* through the wireless power transmitter 148 and the wireless power receiver 118; and receiving, at the radiographic imager 110, 110*b*, 110*c*, 110*d*, 110*e*, 110*f*, 110*g*, a first command associated with an exposure of an imaging array 112 of the radiographic imager 110, 110*b*, 110*c*, 110*d*, 110*e*, 110*f*, 110*g*; transmitting, from the radiographic imager 110, 110*b*, 110*c*, 110*d*, 110*e*, 110*f*, 110*g* to the charging mat 140, 140*b*, 140*c*, 140*e*, 140*f*, 140*g* through the wireless communication transmitter 120 and the wireless communication receiver 150, a second command to stop charging during the exposure; and pausing the transmission of energy from the charging mat 140, 140*b*, 140*c*, 140*e*, 140*f*, 140*g* to the power system 116 of the radiographic imager 110, 110*b*, 110*c*, 110*d*, 110*e*, 110*f*, 110*g* in response to the second command.

In some embodiments, the method further comprises acquiring data from an imaging array 112 of the radiographic imager 110, 110*b*, 110*c*, 110*d*, 110*e*, 110*f*, 110*g* while the transmission of energy is paused.

In some embodiments, the method further comprises transmitting data from an imaging array 112 of the radiographic imager 110, 110*b*, 110*c*, 110*d*, 110*e*, 110*f*, 110*g* through a wireless communication transceiver of the radiographic imager 110, 110*b*, 110*c*, 110*d*, 110*e*, 110*f*, 110*g* separate from the wireless communication transmitter 120.

In some embodiments, the method further comprises aligning the radiographic imager 110, 110*b*, 110*c*, 110*d*, 110*e*, 110*f*, 110*g* and the charging mat 140, 140*b*, 140*c*, 140*e*, 140*f*, 140*g* in response to a signal received by the wireless communication receiver 150 from the wireless communication transmitter 120.

In some embodiments, the method further comprises mounting the charging mat 140, 140*b*, 140*c*, 140*e*, 140*f*, 140*g* in a bucky 170, 170*i* of a radiographic imaging system.

In some embodiments, the method further comprises routing a power cable connected to the wired power input 142 of the charging mat 140, 140*b*, 140*c*, 140*e*, 140*f*, 140*g* through the bucky.

In some embodiments, the method further comprises completely mounting the charging mat 140, 140*b*, 140*c*, 140*e*, 140*f*, 140*g* in a bucky 170, 170*i* of a radiographic imaging system using less than all fastening structures 143 of the charging mat 140, 140*b*, 140*c*, 140*e*, 140*f*, 140*g*.

Some embodiments include a radiographic imaging system, comprising: means for generating an image in response to a radiographic source, comprising: means for wirelessly receiving energy; means for wirelessly receiving a communication; means for charging the means for generating the image, comprising: means for receiving energy; means for wirelessly transmitting energy; means for wirelessly transmitting the communication; and wherein the means for wirelessly transmitting energy is aligned with the means for wirelessly receiving energy simultaneously as the means for wirelessly transmitting the communication is aligned with the means for wirelessly receiving the communication.

Examples of the means for generating an image in response to a radiographic source include the radiographic imager 110, 110*b*, 110*c*, 110*d*, 110*e*, 110*f*, 110*g*. Examples of the means for wirelessly receiving energy include the wireless power receiver 118. Examples of the means for wirelessly transmitting a communication include wireless communication transmitter 120. Examples of the means for charging the means for generating the image include the charging mat 140, 140*b*, 140*c*, 140*e*, 140*f*, 140*g*. Examples of the means for receiving energy include the wired power input 142. Examples of the means for wirelessly transmitting energy include the wireless power transmitter 148. Examples of the means for wirelessly receiving the communication include the wireless communication receiver 150.

In some embodiments, the means for charging the means for generating the image is configured to pause transmitting energy in response to the communication.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 4 can depend from either of claims 1 and 3, with these separate dependencies yielding two distinct embodiments; claim 5 can depend from any one of claim 1, 3, or 4, with these separate dependencies yielding three distinct embodiments; claim 6 can depend from any one of claim 1, 3, 4, or 5, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112(f).

Embodiments of the invention in which an exclusive property or privilege is claimed are defined as follows:

1. A radiographic imaging system, comprising:
  a radiographic imager, including:
    an imaging array;
    imager control logic configured to control the imaging array;
    a power system configured to supply power to at least the imaging array and the imager control logic;
    a wireless power receiver configured to receive energy wirelessly and provide at least part of that energy to the power system; and
    a wireless communication transmitter; and
  a charging mat, including:
    a wired power input;
    a wireless power transmitter configured to transmit energy wirelessly; and
    a wireless communication receiver;
  wherein:
    the wireless power receiver, the wireless power transmitter, the wireless communication receiver, and the wireless communication transmitter are positioned such that the radiographic imager can be placed on the charging mat where, simultaneously, the wireless power receiver is aligned with the wireless power transmitter and the wireless communication receiver is aligned with the wireless communication transmitter;
    the radiographic imager comprises at least one alignment structure;
    the charging mat includes at least one cutout; and
    when the wireless power receiver is aligned with the wireless power transmitter and the wireless communication receiver is aligned with the wireless communication transmitter, the at least one cutout is aligned with the at least one alignment structure.

2. The radiographic imaging system of claim 1, wherein:
  the charging mat further comprises charging mat control logic;
  the imager control logic is configured to receive a command associated with an exposure of the imaging array; and
  the charging mat control logic is configured to receive a command from the imager control logic to stop the wireless power transmitter from transmitting energy during the exposure.

3. The radiographic imaging system of claim 1, wherein the wireless power transmitter and the wireless power receiver comprise an inductive power transmitter and an inductive power receiver, respectively.

4. The radiographic imaging system of claim 1, wherein wireless communication receiver and the wireless communication transmitter comprise an optical communication receiver and an optical communication transmitter, respectively.

5. The radiographic imaging system of claim 1, wherein wireless communication receiver and the wireless communication transmitter comprise a unidirectional communication link.

6. The radiographic imaging system of claim 1, wherein:
  the radiographic imager further comprises a wireless communication transceiver wherein the imager control logic is configured to communicate data from the imaging array through the wireless communication transceiver; and
  the wireless communication transceiver is separate from the wireless communication transmitter.

7. The radiographic imaging system of claim 1, wherein:
  the radiographic imager comprises at least one first alignment structure;
  the charging mat includes at least one second alignment structure; and
  when the at least one first alignment structure and the at least one second alignment structure are mated, the wireless power receiver is aligned with the wireless power transmitter and the wireless communication receiver is aligned with the wireless communication transmitter.

8. The radiographic imaging system of claim 1, wherein:
  the charging mat includes a plurality of first fastening structures;
  the radiographic imaging system further comprises a tray including at least one second fastening structure;
  the number of first fastening structures is greater than the number of the at least one second fastening structure; and
  the charging mat is attached to the tray with at least one of the first fastening structures and the at least one second fastening structure.

9. The radiographic imaging system of claim 8, further comprising:
  a radiographic source; and
  a bucky;
  wherein:
    the tray is a slidable portion of the bucky;
    the radiographic imager is disposed on the charging mat on the tray; and
    the radiographic source is positionable to project radiation towards the bucky.

10. The radiographic imaging system of claim 1, wherein:
  the radiographic imaging system further comprises a bucky configured to receive the radiographic imager; and
  the charging mat is integrated with the bucky.

11. A method, comprising:
  simultaneously aligning a wireless power receiver of a radiographic imager with a wireless power transmitter of a charging mat and a wireless communication receiver of the charging mat with a wireless communication transmitter of the radiographic imager;
  receiving energy at a wired power input of the charging mat;
  transmitting energy from the charging mat to a power system of the radiographic imager through the wireless power transmitter and the wireless power receiver; and
  receiving, at the radiographic imager, a first command associated with an exposure of an imaging array of the radiographic imager;

transmitting, from the radiographic imager to the charging mat through the wireless communication transmitter and the wireless communication receiver, a second command to stop charging during the exposure;

pausing the transmission of energy from the charging mat to the power system of the radiographic imager in response to the second command; and aligning the radiographic imager and the charging mat in response to a signal received by the wireless communication receiver from the wireless communication transmitter.

12. The method of claim 11, further comprising acquiring data from an imaging array of the radiographic imager while the transmission of energy is paused.

13. The method of claim 11, further comprising transmitting data from an imaging array of the radiographic imager through a wireless communication transceiver of the radiographic imager separate from the wireless communication transmitter.

14. The method of claim 11, further comprising mounting the charging mat in a bucky of a radiographic imaging system.

15. The method of claim 14, further comprising routing a power cable connected to the wired power input of the charging mat through the bucky.

16. The method of claim 11, further comprising completely mounting the charging mat in a bucky of a radiographic imaging system using less than all fastening structures of the charging mat.

17. A radiographic imaging system, comprising:
means for generating an image in response to a radiographic source, comprising:
  means for wirelessly receiving energy;
  means for wirelessly transmitting a communication;
means for charging the means for generating the image, comprising:
  means for receiving energy;
  means for wirelessly transmitting energy;
  means for wirelessly receiving the communication; and
wherein:
  the means for wirelessly transmitting energy is aligned with the means for wirelessly receiving energy simultaneously as the means for wirelessly transmitting the communication is aligned with the means for wirelessly receiving the communication;
  the means for generating the image comprises at least one alignment structure;
  the means for charging the means for generating the image includes at least one cutout; and
  when the means for wirelessly receiving energy is aligned with the means for wirelessly transmitting energy and the means for wirelessly receiving the communication is aligned with the means for wirelessly transmitting the communication, the at least one cutout is aligned with the at least one alignment structure.

18. The radiographic imaging system of claim 17, wherein the means for charging the means for generating the image is configured to pause transmitting energy in response to the communication.

\* \* \* \* \*